(12) United States Patent
Kobayashi

(10) Patent No.: US 10,507,535 B2
(45) Date of Patent: Dec. 17, 2019

(54) CUTTING INSERT AND INDEXABLE ROTARY CUTTING TOOL

(71) Applicant: Mitsubishi Hitachi Tool Engineering, Ltd., Tokyo (JP)

(72) Inventor: Yoshiyuki Kobayashi, Narita (JP)

(73) Assignee: Mitsubishi Hitachi Tool Engineering, Ltd., Tokyo (JP)

( * ) Notice: Subject to any disclaimer, the term of this patent is extended or adjusted under 35 U.S.C. 154(b) by 0 days.

(21) Appl. No.: 16/325,913

(22) PCT Filed: Jul. 24, 2017

(86) PCT No.: PCT/JP2017/026635
§ 371 (c)(1),
(2) Date: Feb. 15, 2019

(87) PCT Pub. No.: WO2018/037804
PCT Pub. Date: Mar. 1, 2018

(65) Prior Publication Data
US 2019/0210123 A1 Jul. 11, 2019

(30) Foreign Application Priority Data
Aug. 26, 2016 (JP) .................. 2016-165904

(51) Int. Cl.
*B23C 5/20* (2006.01)
*B23C 5/10* (2006.01)

(52) U.S. Cl.
CPC .............. *B23C 5/1036* (2013.01); *B23C 5/10* (2013.01); *B23C 5/20* (2013.01); *B23C 5/207* (2013.01); *B23C 2210/084* (2013.01)

(58) Field of Classification Search
CPC ...... B23C 2210/084; B23C 2210/0407; B23C 2200/0416; B23C 2200/0403;
(Continued)

(56) References Cited

U.S. PATENT DOCUMENTS 4,588,331 A * 5/1986 Yoshinori ............. B23C 5/1045
407/113
5,244,318 A * 9/1993 Arai ..................... B23C 5/2221
407/113
(Continued)

FOREIGN PATENT DOCUMENTS

DE 102015104679 B3 8/2016
JP 10-315031 A 12/1998
(Continued)

OTHER PUBLICATIONS

International Search Report dated Sep. 19, 2017, issued for PCT/JP2017/026635 and English translation thereof.

*Primary Examiner* — Willmon Fridie, Jr.
(74) *Attorney, Agent, or Firm* — Locke Lord LLP

(57) ABSTRACT

A cutting insert includes a rake face, a flank surface, and a cutting edge, the cutting edge includes a bottom cutting edge that is positioned at a front end in a central axis direction and forms a convex arc shape and an outer peripheral cutting edge aligned with a radial-direction outer end of the bottom cutting edge and forms a convex arc shape of which a curvature radius is larger than that of the bottom cutting edge, an angle formed between a tangent line to a boundary point between the bottom cutting edge and the outer peripheral cutting edge and the central axis is less than 45°, a curvature radius R1 of the bottom cutting edge is 0.3 to 10 mm, and a ratio (R2/R1) of a curvature radius R2 of the outer peripheral cutting edge to the curvature radius R1 of the bottom cutting edge is 3.6 to 333.

9 Claims, 8 Drawing Sheets

(58) Field of Classification Search
CPC .... B23C 2200/0433; B23C 2200/0472; B23C 2200/0488; B23C 5/1036; B23C 5/207
See application file for complete search history.

(56) References Cited

U.S. PATENT DOCUMENTS

| | | | |
|---|---|---|---|
| 5,915,888 A | 6/1999 | Minicozzi | |
| 5,971,671 A * | 10/1999 | Mina | B23C 5/1036 407/113 |
| 6,158,927 A * | 12/2000 | Cole | B23B 51/048 407/113 |
| 6,575,670 B2 * | 6/2003 | Men | B23C 5/1036 407/114 |
| 6,582,165 B1 * | 6/2003 | Baba | B23C 5/1036 407/40 |
| 6,684,742 B1 | 2/2004 | White | |
| 2006/0002780 A1 * | 1/2006 | Stojanovski | B23C 5/1036 409/234 |
| 2010/0129165 A1 * | 5/2010 | Hughes | B23C 5/1036 407/42 |
| 2010/0260559 A1 * | 10/2010 | Higasayama | B23C 5/1036 407/54 |
| 2011/0299945 A1 * | 12/2011 | Choi | B23C 5/1036 407/11 |
| 2012/0207869 A1 | 8/2012 | Imai et al. | |
| 2015/0258617 A1 * | 9/2015 | Kiuchi | B23C 5/1036 407/42 |

FOREIGN PATENT DOCUMENTS

| | | |
|---|---|---|
| JP | 2008-302456 A | 12/2008 |
| JP | 2015-100881 A | 6/2015 |
| WO | 2011/055627 A1 | 5/2011 |

* cited by examiner

CUTTING INSERT AND INDEXABLE ROTARY CUTTING TOOL

TECHNICAL FIELD

The present invention relates to a cutting insert suitable for a cutting process and indexable rotary cutting tool in which the cutting insert is used.

Priority is claimed on Japanese Patent Application No. 2016-165904, filed on Aug. 26, 2016, the content of which is incorporated herein by reference.

BACKGROUND ART

In the related art, for example, an indexable ball end mill as described in Patent Document 1 is known. The indexable ball end mill is used in a case where a curved surface process (vertical wall surface process) or the like of a vertical wall portion is carried out on a work material, for example.

CITATION LIST

Patent Literature

[Patent Document 1] Japanese Unexamined Patent Application, First Publication No. H10-315031

DISCLOSURE OF INVENTION

Technical Problem

However, the indexable ball end mills of the related art have a problem as described below.

It is difficult to improve the process efficiency while maintaining favorable processing surface accuracy (surface roughness) when carrying out a vertical wall surface process or the like on a work material. Specifically, it is difficult to increase a pitch P of a pick feed while suppressing a cusp height CH of a processing scar imparted to a processing surface to be equal or smaller than a predetermined value in a sectional view of a processing surface of a work material W that is cut by using a ball end mill in the related art, which is illustrated in FIG. 11(b).

In addition, it is not possible to carry out a finishing process on a recessed corner portion (vertical wall bottom corner portion) that is formed at a connection portion between a vertical wall surface and a bottom wall surface of a work material.

The present invention has been made in consideration of the above-described circumstance, and an object of the present invention is to provide a cutting insert with which it is possible to improve process efficiency while maintaining favorable processing surface accuracy and to carry out a finishing process of a vertical wall bottom corner portion and an indexable rotary cutting tool in which the cutting insert is used.

Solution to Problem

An aspect of the present invention relates to a plate-shaped cutting insert that is detachably mounted in a front end portion of a tool main body that is rotated around a central axis, the cutting insert including a rake face, a flank surface, and a cutting edge that is formed along an intersection ridge between the rake face and the flank surface, in which the cutting edge includes a bottom cutting edge that is positioned at a front end in a central axis direction and forms a convex arc shape and an outer peripheral cutting edge that is aligned with a radial-direction outer end of the bottom cutting edge and forms a convex arc shape of which a curvature radius is larger than that of the bottom cutting edge, an angle formed between a tangent line to a boundary point between the bottom cutting edge and the outer peripheral cutting edge and the central axis is less than 45°, a curvature radius $R1$ of the bottom cutting edge is 0.3 to 10 mm, and a ratio ($R2/R1$) of a curvature radius $R2$ of the outer peripheral cutting edge to the curvature radius $R1$ of the bottom cutting edge is 3.6 to 333.

In addition, an aspect of the present invention relates to an indexable rotary cutting tool including a tool main body that is rotated around a central axis, an attaching seat formed in a front end portion of the tool main body in a central axis direction, and a cutting insert that is detachably mounted in the attaching seat and includes a cutting edge, in which, as the cutting insert, the above-described cutting insert is used.

According to the cutting insert and the indexable rotary cutting tool of the present invention, the cutting edge of the cutting insert is provided with the bottom cutting edge that is formed on a front end of a tool in the central axis direction and forms a convex arc shape and the outer peripheral cutting edge that is aligned with the radial-direction outer end of the bottom cutting edge while abutting onto the radial-direction outer end (while having common tangent line) and has a convex arc shape of which the curvature radius $R2$ is larger than the curvature radius $R1$ of the bottom cutting edge.

In addition, the angle of a sharp angle from among the sharp angle and an obtuse angle formed between the tangent line to the boundary point between the bottom cutting edge and the outer peripheral cutting edge and the central axis is less than 45°. That is, when a conical rotation trajectory obtained when the tangent line is rotated around the central axis is seen in a radial direction orthogonal to the central axis, an angle that is formed between a pair of inclined tangent lines positioned at opposite radially outer edges of the rotation trajectory is less than 90°. In addition, the bottom cutting edge and the outer peripheral cutting edge are disposed inward of the rotation trajectory (tangent line) in the radial direction.

Therefore, by thrusting the cutting edge of the cutting insert that is rotated around the central axis along with the tool main body to a recessed corner portion (vertical wall bottom corner portion) that is formed at a connection portion between a vertical wall surface and a bottom of a work material, it is possible to carry out a cutting process on the vertical wall bottom corner portion and in the vicinity thereof.

In addition, since the curvature radius $R1$ of the bottom cutting edge that is positioned at the front end of the cutting edge is 0.3 to 10 mm and the bottom cutting edge is formed to have a small curve, it is possible to carry out a finishing process on the vertical wall bottom corner portion.

Specifically, when the curvature radius $R1$ of the bottom cutting edge is less than 0.3 mm, there is a possibility that the bottom cutting edge becomes likely to be damaged at the time of cutting since the bottom cutting edge is excessively sharp. In addition, when the curvature radius $R1$ of the bottom cutting edge exceeds 10 mm, the curve of the bottom cutting edge becomes excessively large, which is not suitable for a finishing process of the vertical wall bottom corner portion.

Therefore, the curvature radius $R1$ of the bottom cutting edge is 0.3 mm to 10 mm.

The curvature radius R1 for making the above-described effects more significant is preferably 0.3 mm to 3 mm, and is more preferably 1.2 mm to 3 mm.

In addition, the curvature radius R2 of the outer peripheral cutting edge is 3.6 to 333 times greater than the curvature radius R1 of the bottom cutting edge and the outer peripheral cutting edge has a large curve that is suitable for carrying out a curved surface process (for example, vertical wall surface process including uneven curved surface (wave-shaped curved surface) process on thin material) or the like of a vertical wall portion of the work material.

Specifically, it is possible to increase a pitch of a pick feed while suppressing a cusp height of a processing scar imparted to a processing surface to be equal or smaller than a predetermined value when carrying out a vertical wall surface process or the like on the work material by attaching the indexable rotary cutting tool provided with the cutting insert of the present invention to a main shaft of a multiaxis (four to six axes) control machining center or the like, for example.

Therefore, it is possible to shorten a processing time while increasing a processing surface quality compared with a cutting tool of the related art such as a ball end mill or a radiance end mill.

More specifically, in a ball end mill-type cutting tool of the related art, a rotation trajectory of the cutting edge around a central axis forms a semispherical shape, and a radius of this rotation trajectory is ½ of a edge diameter of the tool (maximum diameter of rotation trajectory of cutting edge). In addition, in the ball end mill-type cutting tool, both a curvature radius of a cutting edge portion that corresponds to the bottom cutting edge and a curvature radius of a cutting edge portion that corresponds to the outer peripheral cutting edge are ½ of the edge diameter. That is, in the ball end mill-type cutting tool, the pitch of a pick feed is set so that a cusp height becomes a predetermined value or less depending on the edge diameter, and a cutting process is carried out. Accordingly, to increase the pitch of a pick feed, it is necessary to increase the edge diameter. However, when the edge diameter is increased, it becomes difficult to carry out the finishing process of the vertical wall bottom corner portion.

In addition, in the case of a radiance end mill-type cutting tool, a corner R cutting edge is used to carry out a vertical wall surface process or the like. However, the curvature radius of the corner R cutting edge is, generally, smaller than the curvature radius of the cutting edge of the ball end mill (in a case where edge diameters of tools are equal to each other), and thus the pitch of the pick peed becomes smaller than that of the ball end mill.

In contrast, in the present invention, the ratio (R2/R1) of the curvature radius R2 of the outer peripheral cutting edge to the curvature radius R1 of the bottom cutting edge is 3.6 to 333 and a curve of the outer peripheral cutting edge is set to be sufficiently large. Therefore, it is possible to easily increase the pitch of the pick feed compared with the ball end mill-type cutting tool or the radiance end mill-type cutting tool having the same edge diameter. That is, according to the present invention, it is possible to realize a high-efficient process by setting the pitch of the pick feed to be large when achieving the same cusp height as a cusp height of a processing scar imparted to a processing surface processed by a cutting tool in the related art (that is, when making a cusp height equal to or smaller than a predetermined value).

Specifically, when the ratio (R2/R1) of the curvature radius R2 of the outer peripheral cutting edge to the curvature radius R1 of the bottom cutting edge is less than 3.6, it is difficult to form the outer peripheral cutting edge having a large curve and it may not be possible to increase the pitch of the pick feed. In addition, when the ratio (R2/R1) exceeds 333, the outer peripheral cutting edge is formed to be approximately linear so that a cutting resistance becomes large and there is a possibility that chattering vibration occurs or the vertical wall surface process cannot be performed.

Therefore, the ratio (R2/R1) is 3.6 to 333.

The ratio (R2/R1) for making the above-described effects more significant is preferably 10 to 60, and is more preferably 20 to 30.

Here, a difference in pick feed (pitch) between the present invention and a related art example will be described with reference to FIGS. 11(a) and 11(b). FIG. 11(a) illustrates a cross section of a processing surface (processing scars) of a work material W cut with the cutting insert (indexable rotary cutting tool) of the present invention, and FIG. 11(b) illustrates a cross section of a processing surface of the work material W cut with the ball end mill-type cutting tool of the related art. In the drawings, the reference sign P represents the pitch of the pick feed, and the reference sign CH represents the cusp height. As illustrated in FIGS. 11(a) and 11(b), in a case in which the cusp heights CH are set to be equal to one another, the pitch P of the pick feed can be increased more in the present invention of FIG. 11(a) in comparison with the related art example of FIG. 11(b).

In addition, according to the present invention, it is possible to set the pick feed (pitch P) to be large. Therefore, it is possible to decrease the number of protrusions and recesses (scraps) that are imparted to the processing surface of the work material W as processing scars. As a result, it is possible to further increase the processing surface accuracy. Specifically, it is possible to reduce the arithmetic average roughness (surface roughness) Ra of the processing surface of the work material W processed with the outer peripheral cutting edge to be equal to or less than, for example, 0.27 µm.

Furthermore, it is possible to reduce a tool path length (total processing length) since the pick feed can be set to be large and thus it is possible to shorten the processing time. Therefore, it is possible to significantly increase the process efficiency in comparison with a ball end mill-type cutting tool or the like in the related art.

In addition, by setting the pitch (processing pitch) of the pick feed to be large, it is possible to realize a high-efficient process regardless of a feeding speed. In addition, when the processing pitch is set to be large, a cutting path length is shortened and the lifespan of a tool is also lengthened. In addition, there is an advantage in that it is possible to process a wider area with one process. That is, according to the present invention, it is possible to achieve an effect of shortening a production lead time and reducing a processing cost.

As described above, according to the present invention, it is possible to improve process efficiency while maintaining favorable processing surface accuracy of the work material and to carry out a finishing process of the vertical wall bottom corner portion.

In addition, in the cutting insert, when a maximum diameter of a rotation trajectory obtained when the cutting edge is rotated around the central axis is a edge diameter D, a ratio (R1/D) of the curvature radius R1 of the bottom cutting edge to the edge diameter D is preferably 0.025 to 0.1.

In this case, since the curvature radius R1 of the bottom cutting edge is set to be sufficiently smaller than the edge diameter D of the entire cutting edge, it is possible to realize a high-efficient process by ensuring a large formation region (edge length) for the outer peripheral cutting edge and to carry out a finishing process of the vertical wall bottom corner portion with the bottom cutting edge with high quality.

Specifically, since the ratio (R1/D) of the curvature radius R1 of the bottom cutting edge to the edge diameter D is equal to or greater than 0.025, it is possible to effectively prevent damage or the like to the bottom cutting edge while suppressing the bottom cutting edge being excessively sharp. In addition, since the ratio (R1/D) is equal to or smaller than 0.1, it is possible to form the curve of the bottom cutting edge to be small reliably and to carry out a finishing process on the vertical wall bottom corner portion at a high accuracy.

In addition, in the cutting insert, when a maximum diameter of a rotation trajectory obtained when the cutting edge is rotated around the central axis is a edge diameter D, a ratio (R2/D) of the curvature radius R2 of the outer peripheral cutting edge to the edge diameter D is preferably 1.1 to 3.5.

In this case, since the curvature radius R2 of the outer peripheral cutting edge is larger than the edge diameter D of the entire cutting edge, it is possible to set the pitch of the pick feed to be two or more times larger while suppressing the cusp height to be equal to or smaller than a predetermined value, thus making the above-described effects especially significant.

Specifically, since the ratio (R2/D) of the curvature radius R2 of the outer peripheral cutting edge to the edge diameter D is equal to or greater than 1.1, it is possible to make the pitch of the pick feed of the outer peripheral cutting edge at least 2.2 times larger in comparison with the ball end mill-type cutting tool in the related art and thus the process efficiency is significantly increased. In addition, since the ratio (R2/D) is equal to or smaller than 3.5, it is possible to achieve an effect of reducing the cutting resistance by suppressing the outer peripheral cutting edge being formed linearly while increasing the process efficiency with the outer peripheral cutting edge, of which the curvature radius R2 is large.

In addition, in the cutting insert, a rake face of the bottom cutting edge and a rake face of the outer peripheral cutting edge are preferably formed on the same plane.

In this case, the manufacturing of the cutting insert is easy. In addition, since no recessed portions (trough portions) and the like are formed between the rake face of the bottom cutting edge and the rake face of the outer peripheral cutting edge (connection portion), the trapping of chips or the like at the times of a cutting process is suppressed, and a chip-discharging property is enhanced.

In addition, in the cutting insert, the cutting edge preferably includes a linear edge that is positioned at a base end in the central axis direction and extends to be parallel to the central axis.

In this case, by forming the cutting insert such that the diameter of the linear edge of the cutting edge becomes the maximum diameter (edge diameter D) of the cutting edge, it is possible to secure a large regrinding allowance of the cutting edge. That is, since the linear edge is formed, a change in edge diameter D before and after regrinding is prevented. Therefore, the tool lifespan of the cutting insert can be lengthened according to the length (edge length) of the linear edge in the central axis direction. The linear edge may be a superficial portion of the cutting edge that actually does not contribute to a cutting process.

In addition, in the cutting insert, the cutting edge preferably includes a connection edge that connects the outer peripheral cutting edge and the linear edge to each other and forms a convex arc shape of which a curvature radius is smaller than that of the outer peripheral cutting edge.

In this case, since the cutting edge is provided with the connection edge having a convex arc shape, a sharp corner portion is prevented from being formed at the connection portion between the outer peripheral cutting edge and the linear edge. Therefore, it is possible to suppress damage to the cutting edge at the connection portion.

In addition, in the cutting insert, the cutting insert is preferably formed in a front-and-rear inverse symmetric shape centered on the central axis and includes a pair of the cutting edges.

Advantageous Effects of Invention

According to the cutting insert and the indexable rotary cutting tool of the present invention, it is possible to improve process efficiency while maintaining favorable processing surface accuracy and to carry out a finishing process of a vertical wall bottom corner portion.

BEST MODE FOR CARRYING OUT THE INVENTION

Figure 1:
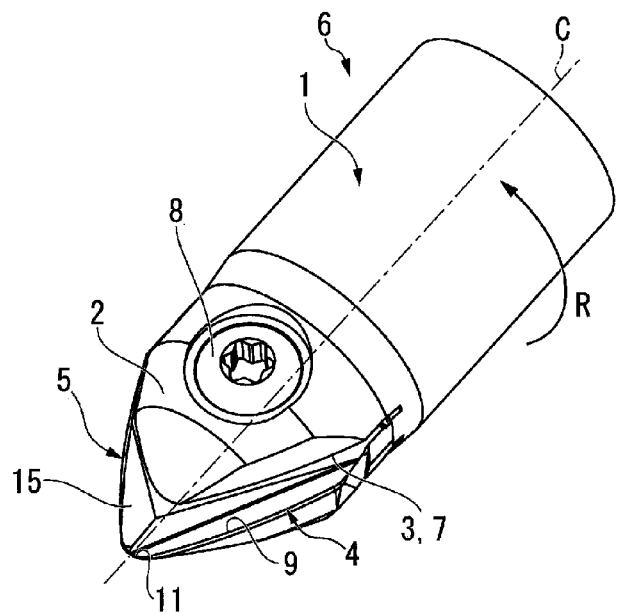
FIG. 1 is a perspective view illustrating an indexable rotary cutting tool according to an embodiment of the present invention.

Hereinafter, a cutting insert 5 according to an embodiment of the present invention and an indexable rotary cutting tool 6 including the cutting insert will be described with reference to drawings.

The cutting insert 5 of the present embodiment is a composite R insert of which a cutting edge 4 is a so-called tapered barrel-shaped composite R cutting edge. In addition, the indexable rotary cutting tool 6 including this cutting insert 5 is suitable for carrying out a variety of cutting processes including a curved surface process (vertical wall surface process) of a vertical wall portion with respect to a work material, a finishing process of a recessed corner portion (vertical wall bottom corner portion) that is formed at a connection portion between a vertical wall surface and a bottom, or the like and is capable of obtaining an excellent surface accuracy for a processing surface of a work material.

As illustrated in FIG. 1 to FIG. 4, the indexable rotary cutting tool 6 includes a substantially cylindrical tool main body 1 that is rotated around a central axis C, an attaching seat 3 formed at a front end portion 2 of the tool main body 1 in a central axis C direction, and the cutting insert 5 that is detachably mounted in the attaching seat 3 and has the cutting edge 4.

The indexable rotary cutting tool 6 of the present embodiment includes the tool main body 1 formed of a steel material or the like and the cutting insert 5 formed of cemented carbide or the like that is harder than the tool main body 1. The cutting insert 5 forming a plate shape is removably mounted in the attaching seat (insert attaching seat) 3 formed at the front end portion 2 of the tool main body 1 in a state in which an insert central axis coincides with the central axis C of the tool. The cutting insert 5 attached to the attaching seat 3 is disposed so that the cutting edge 4 protrudes toward a front end side and a radial-direction outside of the tool main body 1.

A base end portion (shank portion) of the tool main body 1 is attached to a main shaft (not illustrated) of a machine tool, and the indexable rotary cutting tool 6 is rotated in a tool rotation direction R around the central axis C in association with the main shaft being rotary-driven. In addition, the tool main body 1 is sent in a direction intersecting the central axis C or the central axis C direction together with the main shaft, thereby cutting into a work material made of a metallic material or the like with the cutting edge 4 of the cutting insert 5 to carry out a rotary cutting process (milling process). The indexable rotary cutting tool 6 of the present embodiment is more preferably used in, for example, a machine tool such as a multiaxis (four to six axes) control machining center or the like.

In the present embodiment, a direction in which the central axis C of the tool main body 1 extends, that is, a direction along the central axis C (direction parallel to central axis C) will be referred to as the central axis C direction. In addition, in the central axis C direction, a direction from the shank portion toward the attaching seat 3 of the tool main body 1 (downward direction in FIG. 2 and FIG. 3) will be referred to as a front end side, and a direction from the attaching seat 3 toward the shank portion (upward direction in FIG. 2 and FIG. 3) will be referred to as a base end side.

In addition, a direction perpendicular to the central axis C will be referred to as a radial direction. In the radial direction, a direction toward the central axis C will be referred to as an inside of the radial direction, and a direction away from the central axis C will be referred to as an outside of the radial direction.

In addition, a direction around the central axis C will be referred to as a circumferential direction. In the circumferential direction, an orientation in which the tool main body 1 is rotated by the rotation of the main shaft at the time of cutting will be referred to as a tool rotation direction R, and a rotation direction opposite to the tool rotation direction will be referred to as an opposite side to the tool rotation direction R (that is, reverse tool rotation direction).

Figure 6:
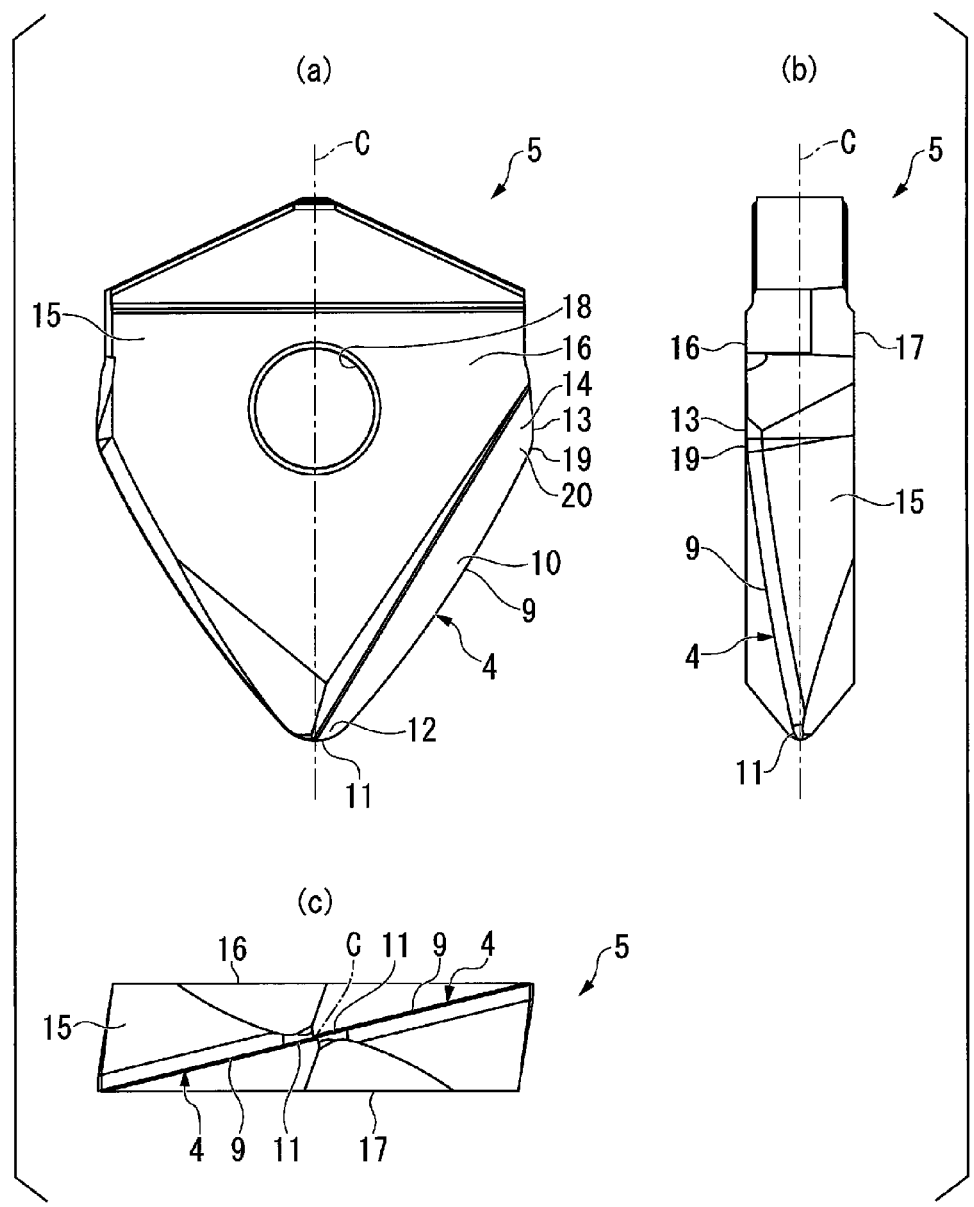
FIG. 6(a) is a plan view.
FIG. 6(b) is a side view.
FIG. 6(c) is a front view, which illustrate the cutting insert.
Figure 7:
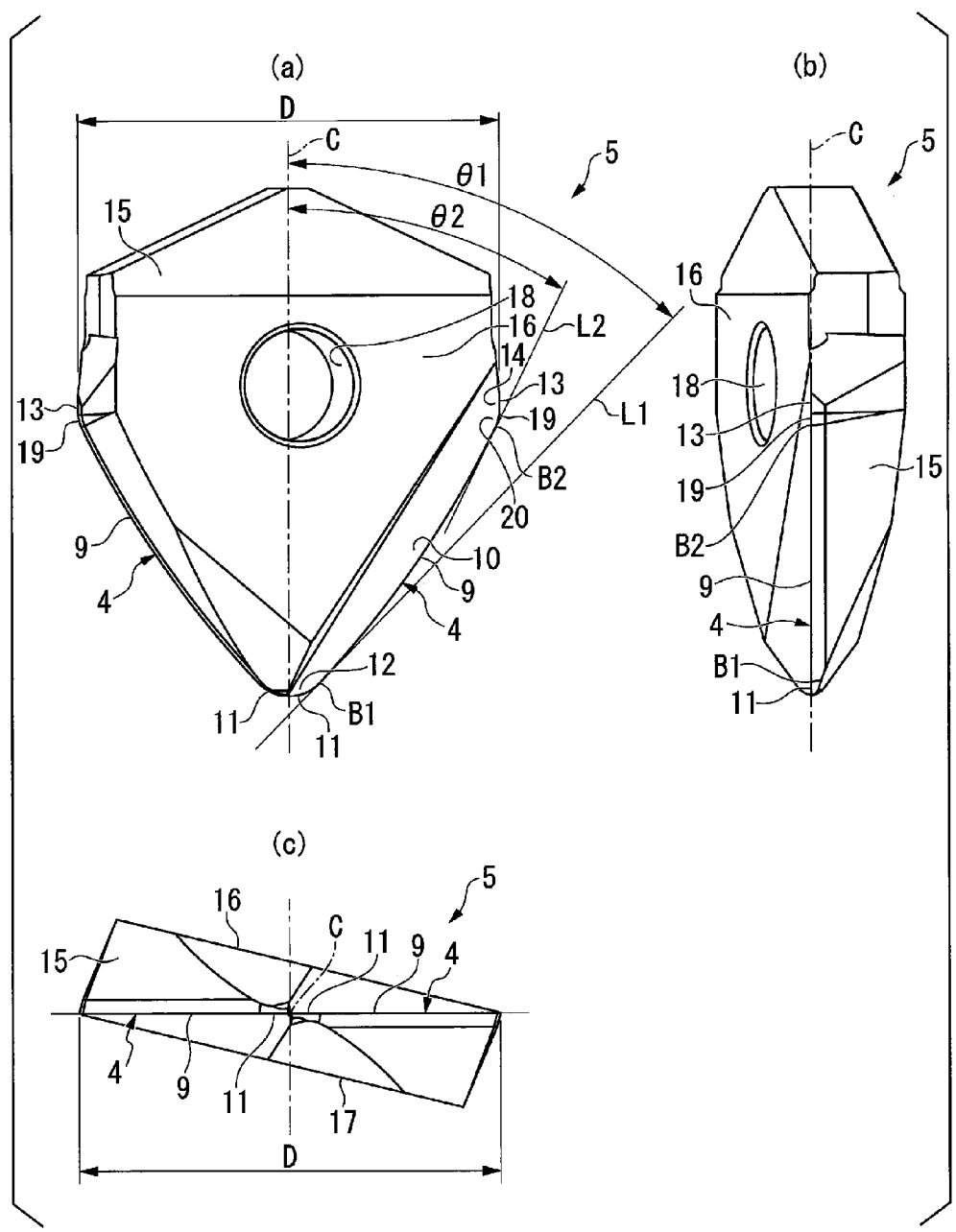
FIG. 7(a) is a plan view (view of cutting insert as seen in direction perpendicular to rake face of cutting edge) of the cutting insert.
FIG. 7(b) is a side view of the cutting insert.
FIG. 7(c) is a front view of the cutting insert, in which a rake face of a cutting edge is seen as a front surface.
Figure 8:
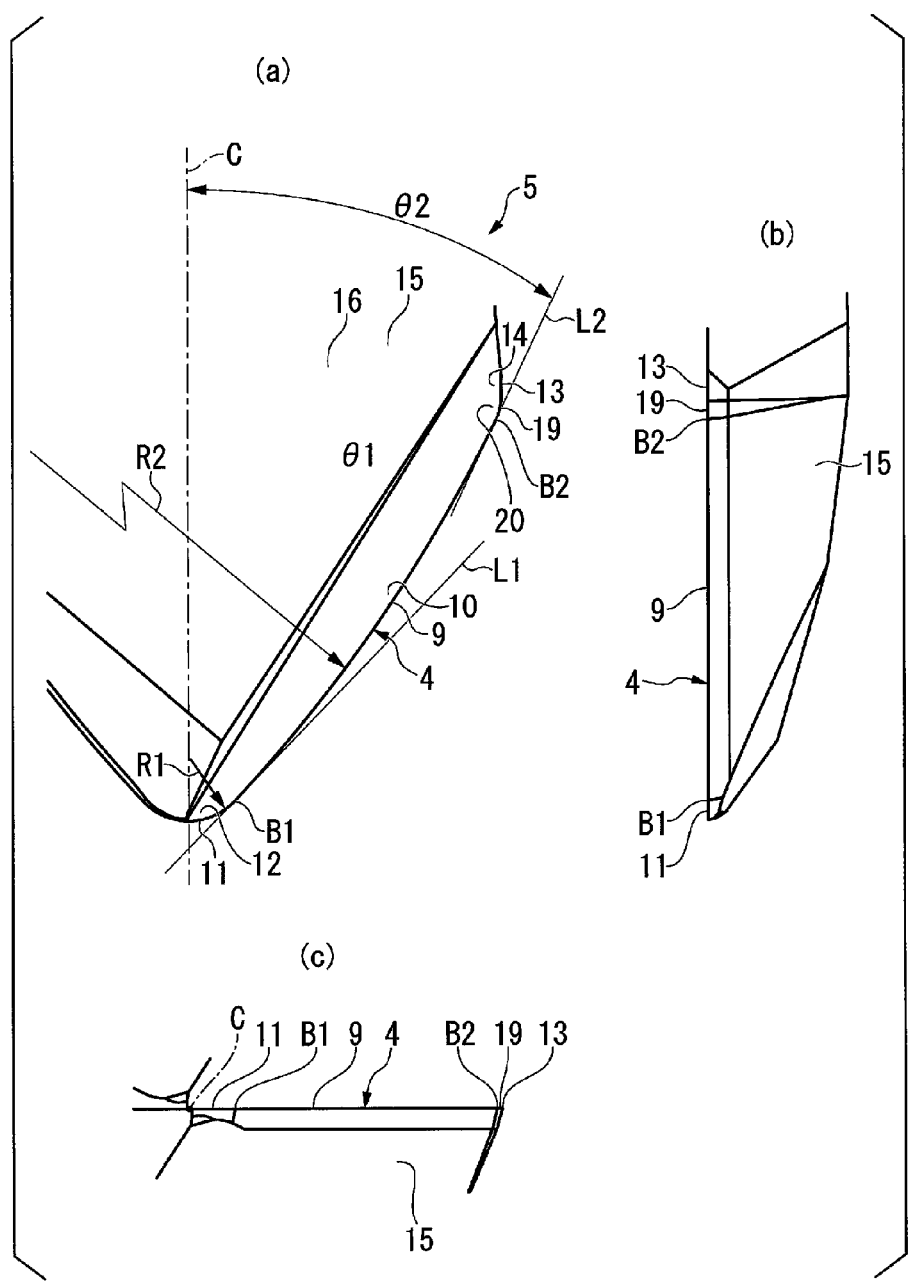
FIG. 8 is an enlarged view of the vicinity of the cutting edge of FIGS. 7(a) to 7(c).

The definitions of the above-described orientations (directions) shall also apply in the same manner to those in the cutting insert 5 in which an insert central axis is set to coincide with the central axis C of the indexable rotary cutting tool 6 (concentrically disposed). Therefore, in FIG. 6 to FIG. 8 illustrating the cutting insert 5, the insert central axis will be expressed using the same reference sign C as the central axis C. In addition, the insert central axis may be simply referred to as the central axis C.

In FIG. 1 to FIG. 4, the attaching seat 3 includes a slit-shaped insert fitting groove 7 formed to include the central axis C of the tool and extend in the radial direction and a fixing screw 8 for fixing the cutting insert 5 inserted into the insert fitting groove 7 in the front end portion 2 of the tool main body 1.

The insert fitting groove 7 is open on a front end surface of the tool main body 1 and extends in the radial direction of the tool main body 1 and is also open on an outer circumferential surface of the tool main body 1. The insert fitting groove 7 forms a slit shape that is formed in a predetermined length (depth) from the front end surface of the tool main body 1 toward the base end side.

The slit-shaped insert fitting groove 7 formed in the front end portion 2 of the tool main body 1 divides the front end portion 2 of the tool main body 1 into two parts and forms a pair of front end half body portions (halved pieces). In accordance with a fact that the width of a pair of flat surface portions 16 and 17 facing a thickness direction of the cutting insert 5 (direction in which fixing screw 8 is inserted), which will be described later, gradually decreases (length of flat surface portions 16 and 17 in direction perpendicular to central axis C decreases) toward the front end side, the width of the pair of front end half body portions clamping the flat surface portions 16 and 17 in the thickness direction also gradually decreases toward the front end side.

Figure 2:
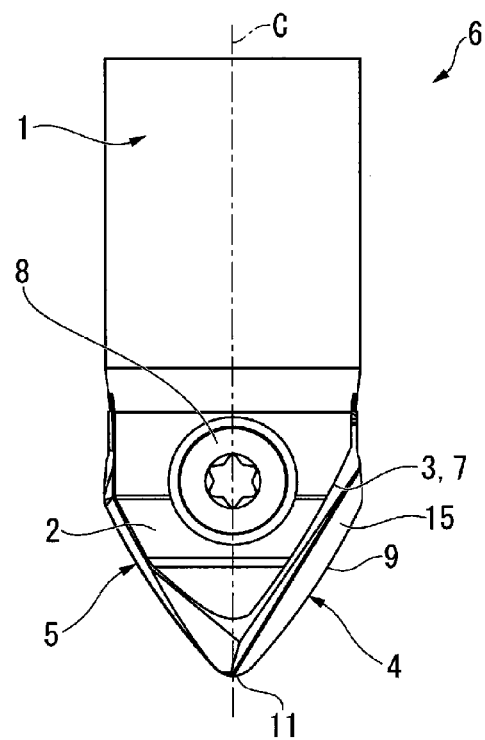
FIG. 2 is a plan view of the indexable rotary cutting tool.

In a tool plan view illustrated in FIG. 2, the front end half body portion is formed in an approximately triangular shape to be sharp toward the front end side. However, the shape of the front end half body portion is not limited thereto, and the front end half body portion may be formed in an approximately semicircular shape to swell toward the front end side in the tool plan view, for example. In this case, a tool main body of a indexable ball end mill in the related art may be used as the tool main body 1.

Figure 3:
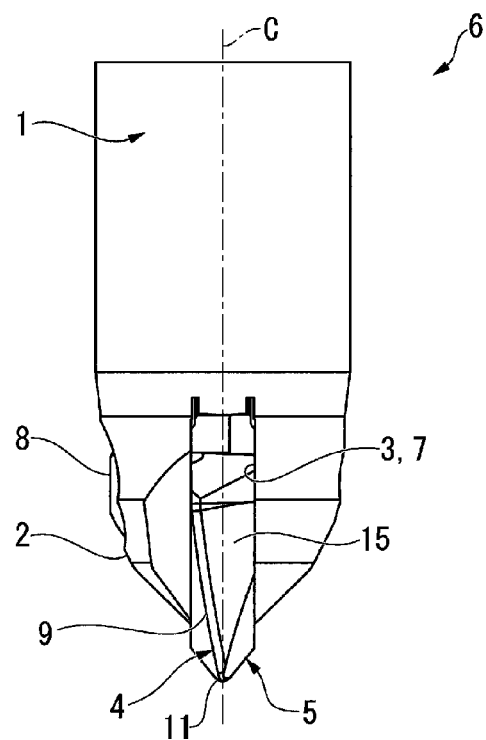
FIG. 3 is a side view of the indexable rotary cutting tool.
Figure 4:
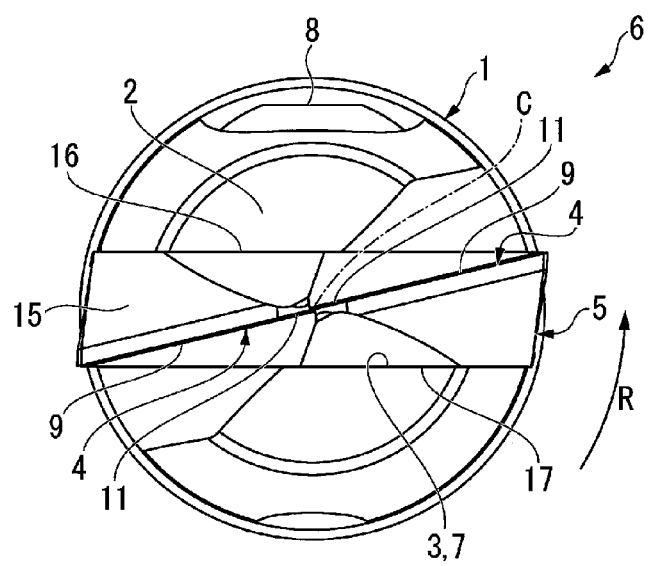
FIG. 4 is a front view of the indexable rotary cutting tool.
Figure 5:
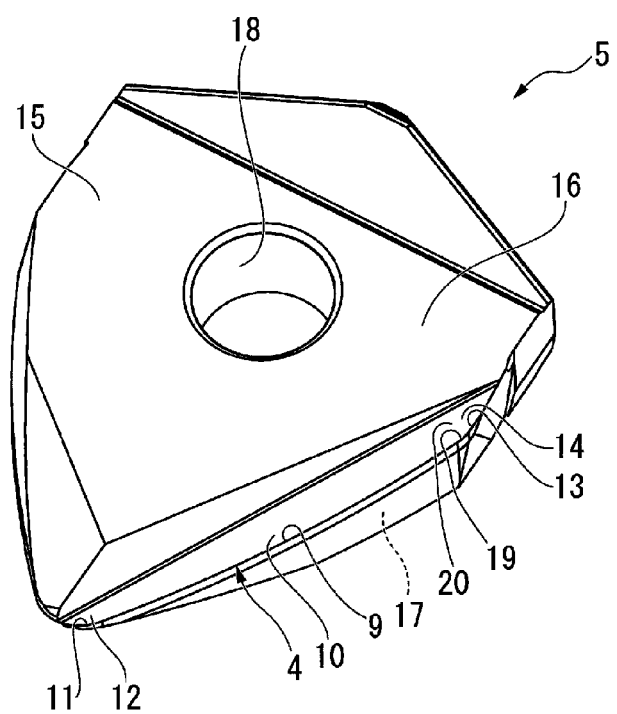
FIG. 5 is a perspective view illustrating a cutting insert that is mounted in the indexable rotary cutting tool.

In addition, in a tool side view illustrated in FIG. 3, the thickness of the pair of front end half body portions gradually decreases toward the front end side.

In addition, in the front end portion 2 of the tool main body 1, an insert fixing screw hole is formed to extend toward a radial-direction inner side from an outer surface of one front end half body portion so as to intersect the insert fitting groove 7 and reach an inside of the other front end half body portion. A screw hole central axis of the insert fixing screw hole extends in the radial direction in the front end portion 2, specifically, extends in an orientation orthogonal to an orientation in which the insert fitting groove 7 extends in the radial direction of the tool main body 1.

In the insert fixing screw hole, an inner diameter of a hole portion formed in one front end half body portion is set to be larger than an inner diameter of a hole portion formed in the other front end half body portion. In addition, on an inner circumferential surface of the hole portion in the other front end half body portion, a female screw portion that screws to a male screw portion of the fixing screw 8 is formed. In the insert fixing screw hole, the hole portion formed in at least one front end half body portion forms a through hole. In the example of the present embodiment, the respective hole portions of the front end half body portion and the other front end half body portion respectively form a through hole.

As illustrated in FIG. 5 to FIG. 8, the cutting insert 5 includes a plate-shaped insert main body 15, a rake face formed on the insert main body 15, a flank surface, the cutting edge 4 formed along an intersection ridge between the rake face and the flank surface, and a screw insertion hole 18 that is formed in the insert main body 15 and penetrates the insert main body 15 in a thickness direction.

The cutting insert 5 of the present embodiment is formed in a front-and-rear inverse symmetric shape (180° rotational symmetric shape) centered on the central axis C (symmetry axis) and includes a pair of cutting edges 4 (two sets). That is, the cutting insert 5 is a two-edge cutting insert.

The insert main body 15 forms a substantially flat plate shape. Front and rear surfaces in the thickness direction of the insert main body 15 form the pair of flat surface portions 16 and 17 forming a flat surface shape perpendicular to the thickness direction. The screw insertion hole 18 is a through hole that penetrates the insert main body 15 in the thickness direction and is formed to be open on one flat surface portion 16 and the other flat surface portion 17. Into the screw insertion hole 18, the fixing screw 8 is inserted when the cutting insert 5 is mounted in and fixed to the attaching seat 3.

The cutting edge 4 is disposed at the front end portion in the central axis C direction and an outer end portion in the radial direction in the insert main body 15.

The cutting edge 4 includes a bottom cutting edge 11 that is positioned at a front end of the cutting edge 4 in the central axis C direction and forms a convex arc shape and an outer peripheral cutting edge 9 that is aligned with a radial-direction outer end of the bottom cutting edge 11 and forms a convex arc shape of which a curvature radius is larger than that of the bottom cutting edge 11. In addition, the cutting edge 4 includes a linear edge 13 that is positioned at a base end of the cutting edge 4 in the central axis C direction and extends to be parallel to the central axis C and a connection edge 19 that connects the outer peripheral cutting edge 9 and the linear edge 13 to each other and forms a convex arc shape of which a curvature radius is smaller than that of the outer peripheral cutting edge 9.

That is, in the present embodiment, the cutting edge 4 includes the bottom cutting edge 11, the outer peripheral cutting edge 9, the connection edge 19, and the linear edge 13 in this order from the front end in the central axis C direction to the base end side. In addition, the cutting edge 4 extends to be inclined with respect to the central axis C as a whole and is formed to swell toward a front end outer circumferential side (has tapered barrel shape as whole).

As illustrated in FIG. 7 and FIG. 8, the bottom cutting edge 11 and the outer peripheral cutting edge 9 have a common tangent line L1 at a boundary point B1 therebetween. That is, the bottom cutting edge 11 and the outer peripheral cutting edge 9 abut onto each other at the boundary point B1. In addition, the outer peripheral cutting edge 9 and the connection edge 19 have a common tangent line L2 at a boundary point B2 therebetween. That is, the outer peripheral cutting edge 9 and the connection edge 19 abut onto each other at the boundary point B2. In addition, the connection edge 19 and the linear edge 13 abut onto each other.

As illustrated in FIG. 7(a) and FIG. 8(a), the bottom cutting edge 11 is disposed in the front end portion of the insert main body 15 in the central axis C direction, extends along the radial direction, and forms an arc shape that protrudes toward the front end side in the central axis C direction.

The bottom cutting edge 11 extends with a slope toward the front end side in the central axis C direction from a radial-direction outer end (boundary point B1) connected to the outer peripheral cutting edge 9 toward a radial-direction inside. In the bottom cutting edge 11, the amount of displacement in the central axis C direction per unit length along the radial direction (that is, slope relative to imaginary plane perpendicular to central axis C) decreases gradually from the radial-direction outer end of the bottom cutting edge 11 toward the radial-direction inside and reaches zero at a radial-direction inner end. In other words, a tangent line to the radial-direction inner end of the bottom cutting edge 11 extends to be parallel to the imaginary plane. As described above, the bottom cutting edge 11 forms an arc shape of which the center of curvature is positioned on the central axis C and that has a predetermined curvature radius R1.

In a total edge length (total cutting edge length) of the cutting edge 4, the radial-direction inner end of the bottom cutting edge 11 is located in a leading end in the central axis C direction. In the present embodiment, the radial-direction inner end of the bottom cutting edge 11 is disposed on the central axis C. That is, the bottom cutting edge 11 is perpendicular to the central axis C at the radial-direction inner end thereof.

When the cutting insert 5 is mounted in the attaching seat 3 (insert fitting groove 7) of the tool main body 1, and the indexable rotary cutting tool 6 is rotated around the central axis C, a rotation trajectory of the bottom cutting edge 11 forms a protruding lens shape that swells toward the front end side. The shape of a section that passes through the central axis C of a rotation trajectory of the cutting edge 4 and is parallel to the central axis C corresponds to the shape of the cutting edge 4 illustrated in FIG. 7(a) and FIG. 8(a).

In the example of the present embodiment, as illustrated in FIG. 7(b) and FIG. 8(b), an axial-direction rake angle (axial rake) of the bottom cutting edge 11 is 0°. However, the axial-direction rake angle is not limited thereto, and the axial-direction rake angle of the bottom cutting edge 11 may be a positive value (positive angle) or a negative value (negative angle). In addition, as illustrated in FIG. 7(c) and FIG. 8(c), a radial-direction rake angle (central-direction rake angle, radial rake) of the bottom cutting edge 11 is set to 0°. A one-dot chain line extending in a vertical direction in FIG. 7(c) is a straight line passing through the central axis C perpendicular to a straight line connecting two outermost circumferential points of the cutting insert 5.

As illustrated in FIG. 7(a) and FIG. 8(a), the radial-direction outer end of the bottom cutting edge 11 and the radial-direction inner end of the outer peripheral cutting edge 9 are smoothly connected together at the boundary point B1. That is, a portion of the cutting edge 4 from the boundary point B1 to the radial-direction inside is the bottom cutting edge 11 and a portion of the cutting edge 4 from the boundary point B1 to the radial-direction outside is the outer peripheral cutting edge 9.

When the rake face of the cutting edge 4 is seen as a front surface from the radial direction orthogonal to the central axis C (corresponding to rotation trajectory of cutting edge 4) as illustrated in FIG. 7(a) and FIG. 8(a), an angle θ1 formed between the tangent line L1 to the boundary point B1 between the bottom cutting edge 11 and the outer peripheral cutting edge 9 and the central axis C is less than 45°.

Specifically, when the rake face of the cutting edge 4 is seen as the front surface, the angle θ1 of a sharp angle from among the sharp angle and an obtuse angle formed by the tangent line L1 and the central axis C intersecting each other, is less than 45°. It is preferable that the angle θ1 be preferably 20° to 44° and it is more preferable that the lower limit of the angle θ1 be 43°. However, the angle θ1 is not limited thereto.

In the rake face facing in the tool rotation direction R of the cutting edge 4, a rake face 12 of the bottom cutting edge 11 is formed in a portion adjacent to the bottom cutting edge 11 (portion adjacent to base end side of bottom cutting edge 11 in central axis C direction). In the example of the present embodiment, the rake face 12 of the bottom cutting edge 11 forms a flat surface shape.

In addition, as illustrated in FIG. 7(a) and FIG. 8(a), when the rake face of the cutting edge 4 is seen as the front surface, the curvature radius R1 of the bottom cutting edge 11 is 0.3 to 10 mm. The curvature radius R1 of the bottom cutting edge 11 is preferably 0.3 to 3 mm and is more preferably 1.2 to 3 mm.

In addition, in the front end surface facing the front end side in the central axis C direction in the insert main body 15, a flank surface of the bottom cutting edge 11 is formed in a portion adjacent to the bottom cutting edge 11 (portion adjacent to side opposite to tool rotation direction R of bottom cutting edge 11). The flank surface of the bottom cutting edge 11 forms a curved surface shape that protrudes toward the front end side. The flank surface of the bottom cutting edge 11 is inclined toward the base end side in the central axis C direction from the bottom cutting edge 11 toward the side opposite to the tool rotation direction R, which imparts a flank angle to the bottom cutting edge 11.

In the example of the present embodiment, a length by which the flank surface of the bottom cutting edge 11 extends from the bottom cutting edge 11 to the side opposite to the tool rotation direction R (width of flank surface) is set to be smaller than a width of the flank surface in a portion of the cutting edge 4 other than the bottom cutting edge 11.

As illustrated in FIG. 7(a) and FIG. 8(a), the outer peripheral cutting edge 9 is disposed in a front end outer circumferential portion of the insert main body 15, extends to be inclined with respect to the central axis C, and forms an arc shape that protrudes toward a front end outer circumferential side. The outer peripheral cutting edge 9 forms an arc having a predetermined curvature radius R2 which is larger than the curvature radius R1 of the bottom cutting edge 11.

The outer peripheral cutting edge 9 extends with a slope toward the radial-direction outside from the front end (boundary point B1) in the central axis C direction which is connected to the bottom cutting edge 11 toward the base end side. In the outer peripheral cutting edge 9, the amount of displacement in the radial direction per unit length along the central axis C direction (that is, slope relative to imaginary plane parallel to central axis C) decreases gradually from the front end of the outer peripheral cutting edge 9 in the central axis C direction toward the base end side.

The edge length of the outer peripheral cutting edge 9 is larger than any other portion of the cutting edge 4. That is, the outer peripheral cutting edge 9 is larger than the bottom cutting edge 11, the connection edge 19, and the linear edge 13 in edge length. In the example of the present embodiment, the edge length of the outer peripheral cutting edge 9 is larger than the sum of the edge lengths of the bottom cutting edge 11, the connection edge 19, and the linear edge 13. The edge length of the outer peripheral cutting edge 9 is equal to or greater than at least ½ of the total edge length of the cutting edge 4, is preferably equal to or greater than ⅔ of the total edge length of the cutting edge 4, and is more preferably equal to or greater than ¾ of the total edge length of the cutting edge 4.

When the cutting insert 5 is mounted in the attaching seat 3 of the tool main body 1, and the indexable rotary cutting tool 6 is rotated around the central axis C, a rotation trajectory of the outer peripheral cutting edge 9 forms a tapered barrel shape (different barrel shape) that swells toward the front end outer circumferential side. That is, the diameter of the rotation trajectory of the outer peripheral cutting edge 9 gradually decreases toward the front end side in the central axis C direction.

In the example of the present embodiment, as illustrated in FIG. 7(b) and FIG. 8(b), the axial-direction rake angle (torsion angle) of the outer peripheral cutting edge 9 is 0°. However, the axial-direction rake angle is not limited thereto, and the axial-direction rake angle of the outer peripheral cutting edge 9 may be a positive value or a negative value. In addition, as illustrated in FIG. 7(c) and FIG. 8(c), a radial-direction rake angle of the outer peripheral cutting edge 9 is set to 0°.

As illustrated in FIG. 7(a) and FIG. 8(a), a base end of the outer peripheral cutting edge 9 in the central axis C direction and a front end of the connection edge 19 in the central axis C direction are smoothly connected together at the boundary point B2. That is, a portion of the cutting edge 4 from the boundary point B2 to the front end side in the central axis C direction is the outer peripheral cutting edge 9 and a portion of the cutting edge 4 from the boundary point B2 to the base end side in the central axis C direction is the connection edge 19.

When the rake face of the cutting edge 4 is seen as the front surface from the radial direction orthogonal to the central axis C (corresponding to rotation trajectory of cutting edge 4) as illustrated in FIG. 7(a) and FIG. 8(a), an angle θ2 formed between the tangent line L2 to the boundary point B2 between the outer peripheral cutting edge 9 and the connection edge 19 and the central axis C is less than 40°. Specifically, when the rake face of the cutting edge 4 is seen as the front surface, the angle θ2 of a sharp angle from among the sharp angle and an obtuse angle formed by the tangent line L2 and the central axis C intersecting each other, is less than 40°. The angle θ2 is smaller than the angle θ1. It is more preferable that the angle θ2 be preferably 0° to 30° and it is still more preferable that the lower limit of the angle θ2 be 26°. However, the angle θ2 is not limited thereto.

In the rake face facing in the tool rotation direction R of the cutting edge 4, a rake face 10 of the outer peripheral cutting edge 9 is formed in a portion adjacent to the outer peripheral cutting edge 9 (portion adjacent to radial-direction inside of outer peripheral cutting edge 9). In the example of the present embodiment, the rake face 10 of the outer peripheral cutting edge 9 forms a flat surface shape.

In addition, as illustrated in FIG. 7(a) and FIG. 8(a), when the rake face of the cutting edge 4 is seen as the front surface, a ratio (R2/R1) of the curvature radius R2 of the outer peripheral cutting edge 9 to the curvature radius R1 of the bottom cutting edge 11 is 3.6 to 333. The ratio (R2/R1) is preferably 10 to 60 and is more preferably 20 to 30.

In addition, in the outer circumferential surface facing the radial-direction outside in the insert main body 15, a flank surface of the outer peripheral cutting edge 9 is formed in a portion adjacent to the outer peripheral cutting edge 9 (portion adjacent to side opposite to tool rotation direction R of outer peripheral cutting edge 9). The flank surface of the outer peripheral cutting edge 9 forms a curved surface shape that protrudes toward the radial-direction outside. The flank surface of the outer peripheral cutting edge 9 is inclined toward the radial-direction inside from the outer peripheral cutting edge 9 toward the side opposite to the tool rotation direction R, which imparts a flank angle to the outer peripheral cutting edge 9.

In the example of the present embodiment, a length by which the flank surface of the outer peripheral cutting edge 9 extends from the outer peripheral cutting edge 9 to the side opposite to the tool rotation direction R (width of flank surface) is set to be constant over the entire edge length of the outer peripheral cutting edge 9 except for a front end portion and becomes minimum at the front end portion.

As illustrated in FIG. 7(a) and FIG. 8(a), the connection edge 19 joins the base end of the outer peripheral cutting edge 9 in the central axis C direction and a front end of the linear edge 13 in the central axis C direction and forms an arc shape that protrudes toward the radial-direction outside.

The connection edge 19 extends with a slope toward the radial-direction outside from the front end in the central axis C direction connected to the outer peripheral cutting edge 9 toward the base end side. In the connection edge 19, the amount of displacement in the radial direction per unit length along the central axis C direction (that is, slope relative to imaginary plane parallel to central axis C) decreases gradually from the front end of the connection edge 19 in the central axis C direction toward the base end side and reaches zero at the base end in the central axis C direction. In other words, a tangent line (corresponds to linear edge 13) to the base end of the connection edge 19 in the central axis C direction extends to be parallel to the central axis C.

When the cutting insert 5 is mounted in the attaching seat 3 of the tool main body 1, and the indexable rotary cutting tool 6 is rotated around the central axis C, a rotation trajectory of the connection edge 19 forms a barrel shape (barrel shape) that swells toward the radial-direction outside.

In the example of the present embodiment, as illustrated in FIG. 7(b) and FIG. 8(b), the axial-direction rake angle (torsion angle) of the connection edge 19 is 0°. However, the axial-direction rake angle is not limited thereto, and the axial-direction rake angle of the outer connection edge 19 may be a positive value or a negative value. In addition, as illustrated in FIG. 7(c) and FIG. 8(c), a radial-direction rake angle of the connection edge 19 is set to 0°.

As illustrated in FIG. 7(a) and FIG. 8(a), the base end of the connection edge 19 in the central axis C direction and the front end of the linear edge 13 in the central axis C direction are smoothly connected together.

In the rake face facing in the tool rotation direction R of the cutting edge 4, a rake face 20 of the connection edge 19 is formed in a portion adjacent to the connection edge 19 (portion adjacent to radial-direction inside of connection edge 19). In the example of the present embodiment, the rake face 20 of the connection edge 19 forms a flat surface shape.

In addition, in the outer circumferential surface facing the radial-direction outside in the insert main body 15, a flank surface of the connection edge 19 is formed in a portion adjacent to the connection edge 19 (portion adjacent to side opposite to tool rotation direction R of connection edge 19). The flank surface of the connection edge 19 forms a curved surface shape that protrudes toward the radial-direction outside. The flank surface of the connection edge 19 is inclined toward the radial-direction inside from the connection edge 19 toward the side opposite to the tool rotation direction R, which imparts a flank angle to the connection edge 19.

In the example of the present embodiment, a length by which the flank surface of the connection edge 19 extends from the connection edge 19 to the side opposite to the tool rotation direction R (width of flank surface) is set to be constant over the entire edge length of the connection edge 19.

As illustrated in FIG. 7(a) and FIG. 8(a), the linear edge 13 is disposed at a base end portion of the cutting edge 4 in the central axis C direction and extends in the central axis C direction. In the example of the present embodiment, the linear edge 13 is positioned at the radially outermost position in the cutting edge 4.

When the cutting insert 5 is mounted in the attaching seat 3 of the tool main body 1, and the indexable rotary cutting tool 6 is rotated around the central axis C, a rotation trajectory of the linear edge 13 forms a cylindrical shape centered on the central axis C.

In the example of the present embodiment, as illustrated in FIG. 7(b) and FIG. 8(b), an axial-direction rake angle (torsion angle) of the linear edge 13 is 0°. In addition, as illustrated in FIG. 7(c) and FIG. 8(c), a radial-direction rake angle of the linear edge 13 is set to 0°.

In the rake face facing in the tool rotation direction R of the cutting edge 4, a rake face 14 of the linear edge 13 is formed in a portion adjacent to the linear edge 13 (portion adjacent to radial-direction inside of linear edge 13). In the example of the present embodiment, the rake face 14 of the linear edge 13 forms a flat surface shape.

In addition, in the outer circumferential surface facing the radial-direction outside in the insert main body 15, a flank surface of the linear edge 13 is formed in a portion adjacent to the linear edge 13 (portion adjacent to side opposite to tool rotation direction R of linear edge 13). The flank surface of the linear edge 13 is formed to form a portion of a cylindrical surface or is formed in a flat surface shape. The flank surface of the linear edge 13 is inclined toward the radial-direction inside from the linear edge 13 toward the side opposite to the tool rotation direction R, which imparts a flank angle to the linear edge 13.

In the example of the present embodiment, a length by which the flank surface of the linear edge 13 extends from the linear edge 13 to the side opposite to the tool rotation direction R (width of flank surface) is set to be constant over a front end portion of the entire edge length of the linear edge 13 and is set to gradually decrease toward the base end side at the base end portion.

In addition, when the maximum diameter (diameter of rotation trajectory (imaginary cylindrical shape) of linear edge 13 in example of present embodiment) of a rotation trajectory obtained when the cutting edge 4 is rotated around the central axis C is a edge diameter D, a ratio (R1/D) of the curvature radius R1 of the bottom cutting edge 11 to the edge diameter D is 0.025 to 0.1.

In addition, a ratio (R2/D) of the curvature radius R2 of the outer peripheral cutting edge 9 to the edge diameter D is 1.1 to 3.5.

In addition, from among the rake faces of the cutting edge 4, at least the rake face 12 of the bottom cutting edge 11 and the rake face 10 of the outer peripheral cutting edge 9 are formed on the same plane. In the present embodiment, all of the rake face 12 of the bottom cutting edge 11, the rake face 10 of the outer peripheral cutting edge 9, the rake face 20 of the connection edge 19, and the rake face 14 of the linear edge 13 are formed on the same plane. That is, all of the rake faces of the cutting edge 4 are formed on a single plane.

According to the cutting insert 5 and the indexable rotary cutting tool 6 of the present embodiment which have been described above, the cutting edge 4 of the cutting insert 5 is provided with the bottom cutting edge 11 that is formed on a front end of a tool in the central axis C direction and forms a convex arc shape and the outer peripheral cutting edge 9 that is aligned with a radial-direction outer end of the bottom cutting edge 11 while abutting onto the radial-direction outer end (while having common tangent line L1) and has a convex arc shape of which the curvature radius R2 is larger than the curvature radius R1 of the bottom cutting edge 11.

In addition, the angle θ1 of a sharp angle from among the sharp angle and an obtuse angle formed between the tangent line L1 to the boundary point B1 between the bottom cutting edge 11 and the outer peripheral cutting edge 9 and the central axis C is less than 45°. That is, when a conical rotation trajectory obtained when the tangent line L1 is rotated around the central axis C is seen in the radial direction orthogonal to the central axis C, an angle (angle θ1×2) that is formed between a pair of inclined tangent lines L1 positioned at opposite radially outer edges of the rotation trajectory is less than 90°. In addition, the bottom cutting edge 11 and the outer peripheral cutting edge 9 are disposed inward of the rotation trajectory (tangent line L1) in the radial direction.

Figure 9:
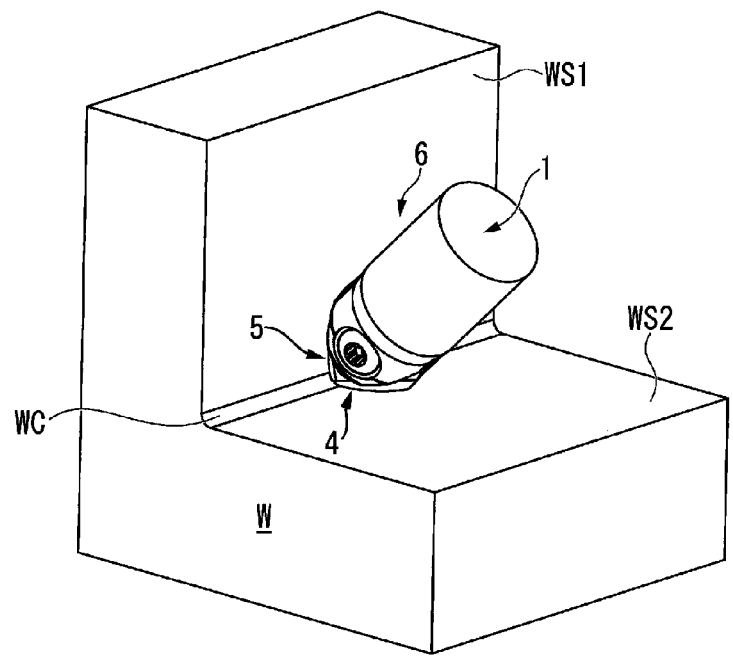
FIG. 9 is a view for explaining a cutting process (finishing process) of a vertical wall bottom corner portion which is performed by using the indexable rotary cutting tool.
Figure 10:
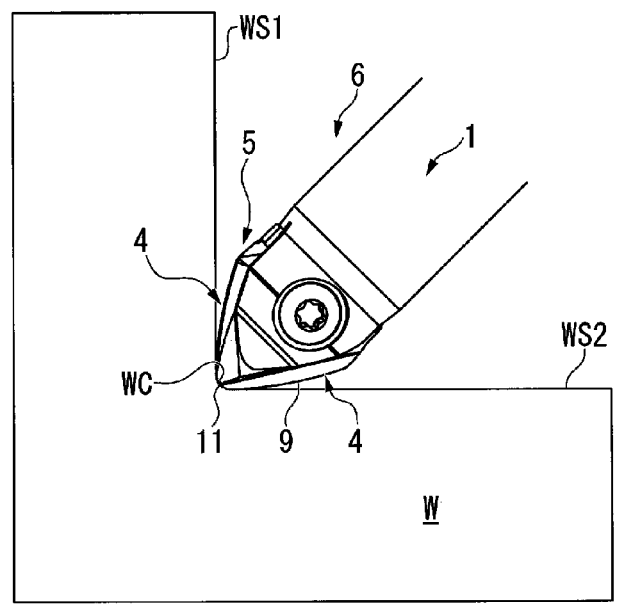
FIG. 10 is a view for explaining the cutting process (finishing process) of the vertical wall bottom corner portion which is performed by using the indexable rotary cutting tool.

Therefore, by thrusting the cutting edge 4 of the cutting insert 5 that is rotated around the central axis C along with the tool main body 1 to a recessed corner portion (vertical wall bottom corner portion) WC that is formed at a connection portion between a vertical wall surface WS1 and a bottom WS2 of a work material W as illustrated in FIG. 9 and FIG. 10, it is possible to carry out a cutting process on the vertical wall bottom corner portion WC and in the vicinity thereof.

In addition, since the curvature radius R1 of the bottom cutting edge 11 that is positioned at the front end of the cutting edge 4 is 0.3 to 10 mm and the bottom cutting edge 11 is formed to have a small curve, it is possible to carry out a finishing process on the vertical wall bottom corner portion WC.

Specifically, when the curvature radius R1 of the bottom cutting edge 11 is less than 0.3 mm, there is a possibility that the bottom cutting edge 11 becomes likely to be damaged at the time of cutting since the bottom cutting edge 11 is excessively sharp. In addition, when the curvature radius R1 of the bottom cutting edge 11 exceeds 10 mm, the curve of the bottom cutting edge 11 becomes excessively large, which is not suitable for a finishing process of the vertical wall bottom corner portion WC.

Therefore, the curvature radius R1 of the bottom cutting edge 11 is 0.3 mm to 10 mm.

The curvature radius R1 for making the above-described effects more significant is preferably 0.3 mm to 3 mm, and is more preferably 1.2 mm to 3 mm.

In addition, the curvature radius R2 of the outer peripheral cutting edge 9 is 3.6 to 333 times greater than the curvature radius R1 of the bottom cutting edge 11 and the outer peripheral cutting edge 9 has a large curve that is suitable for carrying out a curved surface process (for example, vertical wall surface process including uneven curved surface (wave-shaped curved surface) process on thin material) or the like of a vertical wall portion of the work material W.

Specifically, it is possible to increase the pitch of a pick feed while suppressing a cusp height of a processing scar imparted to a processing surface to be equal or smaller than a predetermined value when carrying out a vertical wall surface process or the like on the work material W by attaching the indexable rotary cutting tool 6 provided with the cutting insert 5 of the present embodiment to a main shaft of a multiaxis (four to six axes) control machining center or the like, for example.

Therefore, according to the present embodiment, it is possible to shorten a processing time while increasing a processing surface quality compared with a cutting tool of the related art such as a ball end mill or a radiance end mill.

More specifically, in a ball end mill-type cutting tool of the related art, a rotation trajectory of a cutting edge around a central axis forms a semispherical shape, and a radius of this rotation trajectory is ½ of a edge diameter of the tool (maximum diameter of rotation trajectory of cutting edge). In addition, in the ball end mill-type cutting tool, both a curvature radius of a cutting edge portion that corresponds to the bottom cutting edge and a curvature radius of a cutting edge portion that corresponds to the outer peripheral cutting edge are ½ of the edge diameter. That is, in the ball end mill-type cutting tool, the pitch of a pick feed is set so that a cusp height becomes a predetermined value or less depending on the edge diameter, and a cutting process is carried out. Accordingly, to increase the pitch of the pick feed, it is necessary to increase the edge diameter. However, when the edge diameter is increased, it becomes difficult to carry out the finishing process of the vertical wall bottom corner portion WC.

In addition, in the case of a radiance end mill-type cutting tool, a corner R cutting edge is used to carry out a vertical wall surface process or the like. However, the curvature radius of the corner R cutting edge is, generally, smaller than the curvature radius of the cutting edge of the ball end mill (in a case where edge diameters of tools are equal to each other), and thus the pitch of the pick peed becomes smaller than that of the ball end mill.

In contrast, in the present embodiment, the ratio (R2/R1) of the curvature radius R2 of the outer peripheral cutting edge 9 to the curvature radius R1 of the bottom cutting edge 11 is 3.6 to 333 and a curve of the outer peripheral cutting edge 9 is set to be sufficiently large. Therefore, it is possible to easily increase the pitch of the pick feed compared with the ball end mill-type cutting tool or the radiance end mill-type cutting tool having the same edge diameter. That is, according to the present embodiment, it is possible to realize a high-efficient process by setting the pitch of a pick feed to be large when achieving the same cusp height as a cusp height of a processing scar imparted to a processing surface processed by a cutting tool in the related art (that is, when making a cusp height equal to or smaller than a predetermined value).

Specifically, when the ratio (R2/R1) of the curvature radius R2 of the outer peripheral cutting edge 9 to the curvature radius R1 of the bottom cutting edge 11 is less than 3.6, it is difficult to form the outer peripheral cutting edge 9 having a large curve and it may not be possible to increase the pitch of the pick feed. In addition, when the ratio (R2/R1) exceeds 333, the outer peripheral cutting edge 9 is formed to be approximately linear so that a cutting resistance becomes large and there is a possibility that chattering vibration occurs or the vertical wall surface process cannot be performed.

Therefore, the ratio (R2/R1) is 3.6 to 333.

The ratio (R2/R1) for making the above-described effects more significant is preferably 10 to 60, and is more preferably 20 to 30.

Figure 11:
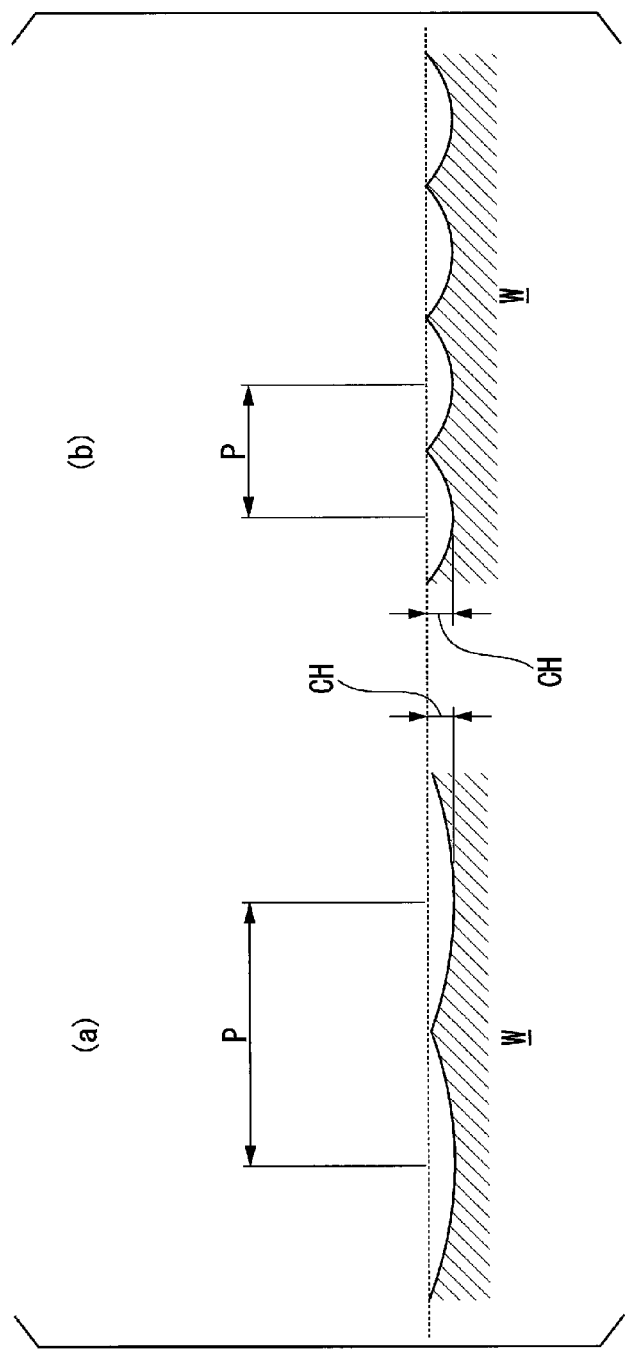
FIG. 11(a) is a view illustrating a pitch of a pick feed and a cusp height of a processing surface cut using the cutting insert (indexable rotary cutting tool) of the present embodiment and FIG. 11(b) is a view illustrating a pitch of a pick feed and a cusp height of a processing surface cut using a cutting tool of the related art.

Here, a difference in pick feed (pitch) between the present embodiment and a related art example will be described with reference to FIGS. 11(a) and 11(b). FIG. 11(a) illustrates a cross section of a processing surface (processing scars) of the work material W cut with the cutting insert 5 (indexable rotary cutting tool 6) of the present embodiment, and FIG. 11(b) illustrates a cross section of a processing surface of the work material W cut with the ball end mill-type cutting tool of the related art. In the drawings, the reference sign P represents the pitch of the pick feed, and the reference sign CH represents the cusp height. As illustrated in FIGS. 11(a) and 11(b), in a case in which the cusp heights CH are set to be equal to one another, the pitch P of the pick feed can be increased more in the present embodiment of FIG. 11(a) in comparison with the related art example of FIG. 11(b).

In addition, according to the present embodiment, it is possible to set the pick feed (pitch P) to be large. Therefore, it is possible to decrease the number of protrusions and recesses (scraps) that are imparted to the processing surface of the work material W as processing scars. As a result, it is possible to further increase the processing surface accuracy. Specifically, it is possible to reduce the arithmetic average roughness (surface roughness) Ra of the processing surface of the work material W processed with the outer peripheral cutting edge 9 to be equal to or less than, for example, 0.27 μm.

Furthermore, it is possible to reduce a tool path length (total processing length) since the pick feed can be set to be large and thus it is possible to shorten the processing time. Therefore, it is possible to significantly increase the process efficiency in comparison with a ball end mill-type cutting tool or the like in the related art.

In addition, by setting the pitch (processing pitch) of the pick feed to be large, it is possible to realize a high-efficient process regardless of a feeding speed. In addition, when the processing pitch is set to be large, a cutting path length is shortened and the lifespan of a tool is also lengthened. In addition, there is an advantage in that it is possible to process a wider area with one process. That is, according to the present embodiment, it is possible to achieve an effect of shortening a production lead time and reducing a processing cost.

As described above, according to the present embodiment, it is possible to improve process efficiency while maintaining favorable processing surface accuracy of the work material W and to carry out a finishing process of the vertical wall bottom corner portion WC.

In addition, in the present embodiment, a ratio (R1/D) of the curvature radius R1 of the bottom cutting edge 11 to the edge diameter D is 0.025 to 0.1. Therefore, effects as described below can be achieved.

That is, in this case, since the curvature radius R1 of the bottom cutting edge 11 is set to be sufficiently smaller than the edge diameter D of the entire cutting edge 4, it is possible to realize a high-efficient process by ensuring a large formation region (edge length) for the outer peripheral cutting edge 9 and to carry out a finishing process of the vertical wall bottom corner portion WC with the bottom cutting edge 11 with high quality.

Specifically, since the ratio (R1/D) of the curvature radius R1 of the bottom cutting edge 11 to the edge diameter D is equal to or greater than 0.025, it is possible to effectively prevent damage or the like to the bottom cutting edge 11 while suppressing the bottom cutting edge 11 being excessively sharp. In addition, since the ratio (R1/D) is equal to or smaller than 0.1, it is possible to form the curve of the bottom cutting edge 11 to be small reliably and to carry out a finishing process on the vertical wall bottom corner portion WC at a high accuracy. The ratio (R1/D) is preferably 0.03 to 0.10 and is more preferably 0.06 to 0.10. However, ratio (R1/D) is not limited thereto.

In addition, in the present embodiment, a ratio (R2/D) of the curvature radius R2 of the outer peripheral cutting edge 9 to the edge diameter D is 1.1 to 3.5. Therefore, effects as described below can be achieved.

That is, in this case, since the curvature radius R2 of the outer peripheral cutting edge 9 is larger than the edge diameter D of the entire cutting edge 4, it is possible to set the pitch P of the pick feed to be two or more times larger while suppressing the cusp height CH to be equal to or smaller than a predetermined value, thus making the above-described effects especially significant.

Specifically, since the ratio (R2/D) of the curvature radius R2 of the outer peripheral cutting edge 9 to the edge diameter D is equal to or greater than 1.1, it is possible to make the pitch P of the pick feed of the outer peripheral cutting edge 9 at least 2.2 times larger in comparison with the ball end mill-type cutting tool in the related art and thus the process efficiency is significantly increased. In addition, since the ratio (R2/D) is equal to or smaller than 3.5, it is possible to achieve an effect of reducing the cutting resistance by suppressing the outer peripheral cutting edge 9 being formed linearly while increasing the process efficiency with the outer peripheral cutting edge 9, of which the curvature radius R2 is large. The ratio (R2/D) is preferably 2.0 3.0 and is more preferably 2.3 to 2.7. However, ratio (R2/D) is not limited thereto.

In addition, in the present embodiment, the rake face 12 of the bottom cutting edge 11 and the rake face 10 of the outer peripheral cutting edge 9 are formed on the same plane. Therefore, the manufacturing of the cutting insert 5 is easy. In addition, since no recessed portions (trough portions) and the like are formed between the rake face 12 of the bottom cutting edge 11 and the rake face 10 of the outer peripheral cutting edge 9 (connection portion), the trapping of chips or the like at the times of a cutting process is suppressed, and a chip-discharging property is enhanced. In the present embodiment, all of the rake face 12 of the bottom cutting edge 11, the rake face 10 of the outer peripheral cutting edge 9, the rake face 20 of the connection edge 19, and the rake face 14 of the linear edge 13 are formed on the same plane. Therefore, the above-described effects become more significant.

In addition, in the present embodiment, the cutting edge 4 includes the linear edge 13 that is positioned at the base end in the central axis C direction and extends to be parallel to the central axis C. Therefore, effects as described below can be achieved.

That is, in this case, by forming the cutting insert 5 such that the diameter of the linear edge 13 of the cutting edge 4 becomes the maximum diameter (edge diameter D) of the cutting edge 4, it is possible to secure a large regrinding allowance of the cutting edge 4. That is, since the linear edge 13 is formed, a change in edge diameter D before and after regrinding is prevented. Therefore, the tool lifespan of the cutting insert 5 can be lengthened according to the length (edge length) of the linear edge 13 in the central axis C direction. The linear edge 13 may be a superficial portion of the cutting edge 4 that actually does not contribute to a cutting process.

In addition, in the present embodiment, the cutting edge 4 includes the connection edge 19 that connects the outer peripheral cutting edge 9 and the linear edge 13 to each other and forms a convex arc shape of which a curvature radius is smaller than that of the outer peripheral cutting edge 9. Therefore, effects as described below can be achieved.

That is, in this case, since the cutting edge 4 is provided with the connection edge 19 having a convex arc shape, a sharp corner portion is prevented from being formed at the connection portion between the outer peripheral cutting edge 9 and the linear edge 13. Therefore, it is possible to suppress damage to the cutting edge 4 at the connection portion.

The present invention is not limited to the above-described embodiment, and it is possible to add a variety of modifications within the scope of the gist of the present invention.

For example, in the above-described embodiment, the screw insertion hole 18 is formed in the cutting insert 5, however, the screw insertion hole 18 may not be formed in the cutting insert 5. In this case, the cutting insert 5 is detachably mounted in the attaching seat 3 of the tool main body 1 using a clamp mechanism or the like.

In addition, in the above-described embodiment, the rake face 12 of the bottom cutting edge 11, the rake face 10 of the outer peripheral cutting edge 9, the rake face 20 of the connection edge 19, and the rake face 14 of the linear edge 13 are formed on the same plane. However, the configuration is not limited thereto and these rake faces 12, 10, 20, and 14 may be formed on the same curved surface (convex curved surface or concave curved surface). Alternately, these rake faces 12, 10, 20, and 14 may be formed of mutually different planes or curved planes.

In addition, in the above-described embodiment, the radial-direction rake angles of all of the bottom cutting edge 11, the outer peripheral cutting edge 9, the connection edge 19, and the linear edge 13 are 0°. However, the radial-direction rake angles of these edges may be a positive value or a negative value.

In addition, in the above-described embodiment, the linear edge 13 is positioned at the radially outermost position in the cutting edge 4. However, the configuration is not limited thereto and the connection edge 19 may be positioned at the radially outermost position in the cutting edge 4. In this case, the edge diameter D of the cutting edge 4 is set at the connection edge 19. Alternatively, the outer peripheral cutting edge 9 may be positioned at the radially outermost position in the cutting edge 4.

In addition, the cutting edge 4 may not be provided with the linear edge 13 or the connection edge 19.

In addition, in the above-described embodiment, as a material of a base body (the insert main body 15) of the cutting insert 5, it is also possible to use, for example, a cermet, high-speed steel, titanium carbide, silicon carbide, silicon nitride, aluminum nitride, aluminum oxide, a ceramic made of a mixture thereof, a cubic boron nitride sintered body, a diamond sintered body, or an ultrahigh-pressure sintered body obtained by firing a hard phase made of polycrystalline diamond or cubic boron nitride or a bonded phase of a ceramic, an iron-group metal, or the like in addition to cemented carbide including tungsten carbide and cobalt.

In addition, the tool main body 1 is manufactured using, for example, an alloy tool steel such as SKD61, and, additionally, it is also possible to use a material formed by joining an alloy tool steel such as SKD61 and cemented carbide.

Additionally, within the scope of the gist of the present invention, the respective constitutions (constituent elements) described in the above-described embodiment, the modification examples, annexes, and the like may be combined together, and the addition, omission, substitution, and other modifications of the constitutions are possible. In addition, the present invention is not limited by the above-described embodiment and is limited only by the claims.

INDUSTRIAL APPLICABILITY

With the cutting insert and the indexable rotary cutting tool of the present invention, it is possible to improve process efficiency while maintaining favorable processing surface accuracy of a work material and to carry out a finishing process of a vertical wall bottom corner portion. Therefore, the cutting insert and the indexable rotary cutting tool are industrially applicable.

REFERENCE SIGNS LIST

1 TOOL MAIN BODY
2 FRONT END PORTION
3 ATTACHING SEAT
4 CUTTING EDGE
5 CUTTING INSERT
6 INDEXABLE ROTARY CUTTING TOOL
9 OUTER PERIPHERAL CUTTING EDGE
10 RAKE FACE OF OUTER PERIPHERAL CUTTING EDGE
11 BOTTOM CUTTING EDGE
12 RAKE FACE OF BOTTOM CUTTING EDGE
13 LINEAR EDGE
19 CONNECTION EDGE
B1 BOUNDARY POINT
C CENTRAL AXIS
D EDGE DIAMETER
L1 TANGENT LINE
R1, R2 CURVATURE RADIUS
$\theta 1$ ANGLE

The invention claimed is:
1. A plate-shaped cutting insert that is detachably mounted in a front end portion of a tool main body that is rotated around a central axis, the cutting insert comprising:
   a rake face;
   a flank surface; and
   a cutting edge that is formed along an intersection ridge between the rake face and the flank surface,
   wherein the cutting edge includes
      a bottom cutting edge that is positioned at a front end in a central axis direction and forms a convex arc shape, and
      an outer peripheral cutting edge that is aligned with a radial-direction outer end of the bottom cutting edge and forms a convex arc shape of which a curvature radius is larger than that of the bottom cutting edge,
   wherein an angle formed between a tangent line to a boundary point between the bottom cutting edge and the outer peripheral cutting edge and the central axis is less than 45°,
   wherein a curvature radius R1 of the bottom cutting edge is 0.3 to 10 mm, and
   wherein a ratio (R2/R1) of a curvature radius R2 of the outer peripheral cutting edge to the curvature radius R1 of the bottom cutting edge is 3.6 to 333.
2. The cutting insert according to claim 1,
   wherein, when a maximum diameter of a rotation trajectory obtained when the cutting edge is rotated around the central axis is an edge diameter D, a ratio (R1/D) of the curvature radius R1 of the bottom cutting edge to the edge diameter D is 0.025 to 0.1.

3. The cutting insert according to claim 1,
wherein, when a maximum diameter of a rotation trajectory obtained when the cutting edge is rotated around the central axis is an edge diameter D, a ratio (R2/D) of the curvature radius R2 of the outer peripheral cutting edge to the edge diameter D is 1.1 to 3.5.

4. The cutting insert according to claim 1,
wherein a rake face of the bottom cutting edge and a rake face of the outer peripheral cutting edge are formed on the same plane.

5. The cutting insert according to claim 1,
wherein the cutting edge includes a linear edge that is positioned at a base end in the central axis direction and extends to be parallel to the central axis.

6. The cutting insert according to claim 5,
wherein the cutting edge includes a connection edge that connects the outer peripheral cutting edge and the linear edge to each other and forms a convex arc shape of which a curvature radius is smaller than that of the outer peripheral cutting edge.

7. The cutting insert according to claim 1,
wherein the cutting insert is formed in a front-and-rear inverse symmetric shape centered on the central axis and includes a pair of the cutting edges.

8. An indexable rotary cutting tool, comprising:
a tool main body that is rotated around a central axis;
an attaching seat that is formed in a front end portion of the tool main body in a central axis direction; and
a cutting insert that is detachably mounted in the attaching seat and includes a cutting edge,
wherein, as the cutting insert, the cutting insert according to claim 1 is used.

9. A tool main body rotated around a central axis, comprising:
an attaching seat formed in a front end portion of the tool main body in a central axis direction,
wherein a cutting insert is detachably mounted in the attaching seat and includes a cutting edge, and
wherein, as the cutting insert, the cutting insert according to claim 1 is used.

* * * * *